(12) United States Patent
Jechoux

(10) Patent No.: US 7,328,025 B2
(45) Date of Patent: Feb. 5, 2008

(54) METHOD FOR IMPLICIT ALLOCATION OF RESOURCES

(75) Inventor: Bruno Jechoux, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 664 days.

(21) Appl. No.: 10/052,458

(22) Filed: Jan. 23, 2002

(65) Prior Publication Data
US 2002/0102981 A1    Aug. 1, 2002

(30) Foreign Application Priority Data
Jan. 29, 2001    (FR) .................................. 01 01460

(51) Int. Cl.
*H04Q 7/20*    (2006.01)
(52) U.S. Cl. ................ 455/452.1; 455/450; 455/422.1; 455/509; 455/464
(58) Field of Classification Search ............... 455/450, 455/452.1, 464, 422.1; 370/329, 330, 341, 370/342, 343, 431
See application file for complete search history.

(56) References Cited

U.S. PATENT DOCUMENTS

| | | | |
|---|---|---|---|
| 5,515,369 A * | 5/1996 | Flammer et al. ............ | 370/480 |
| 6,108,321 A * | 8/2000 | Anderson et al. ........... | 370/329 |
| 6,256,356 B1 * | 7/2001 | Suzuki ........................ | 375/260 |
| 6,587,449 B1 * | 7/2003 | Bartolome Pascual et al. ........................... | 370/336 |
| 6,724,813 B1 * | 4/2004 | Jamal et al. ................. | 375/219 |
| 6,754,497 B1 * | 6/2004 | Ozluturk ..................... | 455/437 |
| 2002/0128014 A1 * | 9/2002 | Chen .......................... | 455/447 |

FOREIGN PATENT DOCUMENTS

| | | |
|---|---|---|
| DE | 199 15 031 | 11/1999 |
| EP | 0 069 477 | 1/1983 |
| EP | 1 047 278 | 10/2000 |

OTHER PUBLICATIONS

Tuma et al., Engineering Mathematics Handbook, 1998, McGraw-Hill, 4th Edition, p. 305.*
M. Almgren, et al., Global Telecommunications Conference, Conference Record, Communication Theory Mini-Conference, GLOBECOM '95, pp. 1517-1521, XP-010164474, "Adaptive Channel Allocation in Tacs", Nov. 13, 1995.
IBM Technical Disclosure Bulletin, vol. 39, No. 1, p. 353, XP-000556428, "Pseudorandom Rotation of Slot Assignments in Radio TDMA Systems", Jan. 1996.
O. K. Tonguz, et al., Vehicular Technology Conference, pp. 1659-1663, XP-010229049, "A Novel Channel Assignment to Reduce Intermodulation Distortion in PCS", May 4, 1997.

* cited by examiner

*Primary Examiner*—Charles N. Appiah
*Assistant Examiner*—Willie J. Daniel, Jr.
(74) *Attorney, Agent, or Firm*—Oblon, Spivak, McClelland, Maier & Neustadt, P.C.

(57) ABSTRACT

A method for dynamic allocation of transmission resources to a plurality of communications between a base station and a plurality of mobile terminals includes generating a pseudo-random sequence and performing an allocation. Each resource includes a plurality of possible values, and an allocation controller associated with the base station, referred to as the fast allocation controller, is able to allocate to the communications only certain combinations of possible values, referred to as available resources. The fast allocation controller generates a pseudo-random sequence and performs the allocation by selecting at least one available resource for each communication according to a value of the pseudo-random sequence.

13 Claims, 5 Drawing Sheets

METHOD FOR IMPLICIT ALLOCATION OF RESOURCES

BACKGROUND OF THE INVENTION

1. Field of the Invention

The present invention concerns in general terms a method of allocating radio transmission resources for a mobile telecommunication system, particularly for a telecommunication system of the UTRA-TDD type.

2. Discussion of the Background

FIG. 1 depicts highly schematically the access network in the context of the UMTS, known as UTRAN (standing for UMTS Terrestrial Radio Access Network). The access network effects the connection between the mobile terminal of the user (MS, standing for Mobile Station) and the interconnection network (CN, standing for Core Network). It includes access network controllers (RNC, standing for Radio Network Controller) and base stations (also referred to as B nodes), each RNC controller being able to control a plurality of base stations. The downlinks between the base station and the mobile terminals which come under it are separated from the uplinks by the use of different frequencies, a so-called frequency duplex mode or FDD (standing for Frequency Division Duplex), or by different transmission time ranges, a so-called time duplex mode or TDD (standing for Time Division Duplex).

FIG. 2 depicts schematically a transmission frame in a UTRA-TDD (UMTS Terrestrial Radio Access Network in TDD mode) telecommunication system. The transmission frame has a duration of 10 ms and is divided into 15 transmission time slots denoted $TS_0$ to $TS_{14}$. The transmission frame is also divided into at least two distinct time ranges (duplex partitioning) allocated respectively to the uplinks (the up arrows) and to the downlinks (the down arrows). The separation between consecutive time ranges is referred to as the switching point. A frame generally has several switching points. In order to reduce interference, the base stations adjacent to a given base station are synchronous with it and have the same switching points. The communications, up or down, within a cell served by a base station are isolated from the communications of an adjacent cell by means of codes known as scrambling codes. The codes relating to adjacent cells are chosen so as to have a low level of intercorrelation in order to minimise inter-cell interference. However, in practice, because notably of the scattering in the delays caused by multipath propagation, the level of intercorrelation is still too high on reception. As a result the data transmitted at a given moment within a cell may be interfered with by data transmitted at the same moment within an adjacent cell. This inter-cell disturbance or interference is variable since it depends on many factors, amongst others the spreading codes, scrambling codes, transmission powers and characteristics of the different transmission channels of the various users. However, the interference level varies little within a time slot from one frame to another if the connections and the allocation of the radio resources do not change.

In order to combat inter-cell interference in the UTRA TDD system, a dynamic allocation of the time slots or DCA (Dynamic Channel Allocation) is provided, consisting of dynamically allocating time slots and access codes to the different communications. It has been proposed to divide this dynamic allocation into a slow allocation (Slow DCA) and a fast allocation (Fast DCA). In the context of this proposal, the slow allocation is supervised by the RNC and aims at settling conflicts in resources between adjacent base stations. The rapid allocation, for its part, is dealt with by the base station and its function is the dynamic allocation, to the different communications, of the resources allocated by the slow allocation. To do this, the base station regularly transmits a measuring request to the mobile terminals. On such a request, a mobile terminal effects a measurement of the interference level and transmits the result thereof to the base station. The base station then allocates the available resources according to these results. This allocation being carried out at a sufficiently high frequency, to make it possible to follow the rapid variations in the interference levels, the result is a high signalling rate (3 messages per allocation cycle), which burdens the radio resources of the system.

The problem at the basis of the invention is to allow a dynamic allocation of the radio resources which requires only a little signalling.

SUMMARY OF THE INVENTION

This problem is resolved by a method of dynamic allocation of transmission resources to a plurality of communications between a base station and a plurality of mobile terminals, each resource consisting of a plurality of possible values, an allocation controller associated with the base station, referred to as the fast allocation controller, being able to allocate to the said communications only certain combinations of possible values, referred to as available resources, in which the said fast allocation controller generates a pseudo-random sequence and allocates at least one available resource to a communication according to a value of the said pseudo-random sequence.

Advantageously, the said available resources are indexed sequentially and a combination of available resources is allocated if its index is equal to a value of the said pseudo-random sequence.

According to one embodiment, parameters for generation of the said random sequence are transmitted from the base station to the mobile terminals and the said random sequence is generated by the mobile terminals from the said generation parameters.

Where the transmission resources of a plurality of adjacent base stations are controlled by a slow allocation controller, the resources available for each base station are determined regularly, at a first frequency, by the said slow allocation controller and transmitted by the latter to the fast allocation controllers associated with the said base stations.

The information supplying the resources available at a base station is advantageously transmitted by the latter to the mobile terminals which it serves. According to a variant, each fast allocation controller allocates the resources available at the base station with which it is associated at a second frequency substantially higher than the said first frequency.

The resources comprise for example time slots, spectral spreading codes intended to separate the different communications and/or transmission frequencies.

The resources comprise for example time slots, spectral spreading codes intended to separate the different communications and/or transmission frequencies.

The random sequence for the dynamic allocation is preferably calculated by:

$$X(1) = x_0$$

where $x_0$ is a word of N bits, $x_0$ constituting the seed of the sequence, a−1 is a non-zero integer which is a multiple of 4, i is a sequence index, and b is an odd number, and where N is an integer such that $2^N$ is greater than the maximum number of available resources.

If the base station and the mobile terminals belong to a UTRA-TDD mobile telecommunication system, a first subset of available resources is dedicated to the uplink communications and a second subset of available resources is dedicated to the downlink communications. The available resources of the first subset are then allocated to the uplink communications independently of the allocation of the available resources of the second subset to the downlink communications.

The parameters for generating the random sequence are advantageously transmitted over the common control channel BCH.

BRIEF DESCRIPTION OF THE DRAWINGS

The characteristics of the invention mentioned above, as well as others, will emerge more clearly from a reading of the description given in relation to the accompanying drawings, amongst which.

DESCRIPTION OF THE PREFERRED EMBODIMENTS

Figure 1:
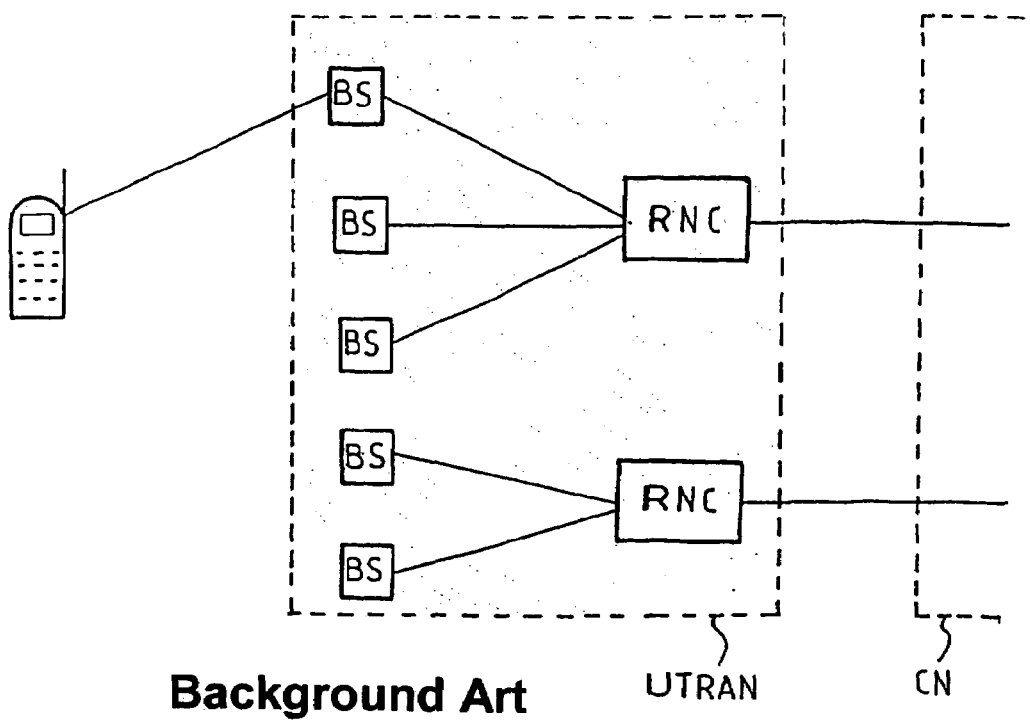
FIG. 1 depicts schematically a system in a UTRA-TDD access network.
Figure 2:
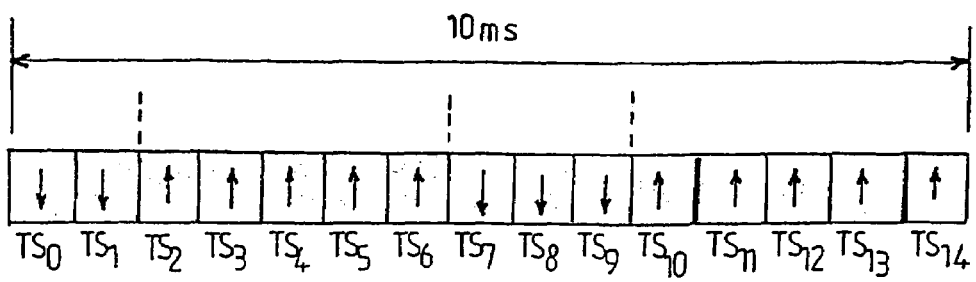
FIG. 2 depicts a transmission frame used in a UTRA-TDD system.

The general idea at the basis of the invention is to use an implicit method of allocating the radio resources according to a pseudo-random scheme.

The dynamic allocation proposed is effected on two hierarchical levels: an upper slow allocation level and a lower fast allocation level. According to one embodiment, the management of the slow allocation is a matter for the RNC and the management of the fast allocation is a matter for the base stations which come under it. According to another embodiment, the management of the two allocation levels is a matter for the RNC. In general terms, the two allocation levels are respectively dealt with by a slow allocation controller or SDAC (slow dynamic allocation controller) and a fast allocation controller or FDAC (fast dynamic allocation controller) depending hierarchically on the SDAC, as will be seen later. The function of the SDAC is to distribute certain resources between several adjacent base stations whilst an FDAC is associated with a base station and manages the transmission resources available at the cell. It should be noted that the SDAC and the FDACs which come under it can form part of a common control device situated at the RNC. Alternatively, only the SDAC will be situated at the RNC and the FDAC will be situated at the base stations.

The interference measurements reported by the different mobile terminals to the base station which serves them are transmitted to the SDAC, either directly or in the form of a summary parameter. In accordance with this information as well as the respective loads on the base stations and the quality of service (QoS) required by the different communications, the SDAC allocates radio transmission resources to the different cells. These will, for example in the case of UTRA-TDD, be scrambling codes $(SC_k)$ k=1, . . . 16, transmission time slots $(TS_j)$ j=1, . . . , 15, and transmission frequencies (fi), i=1, . . . , I. In more general terms, the SDAC can manage N distinct types of resource $(R_n)$, where each resource $R_n$ can be considered to be a discrete set of $M_n$ possible values $R_{nm}$, m=1, . . . , M.

The slow allocation made by the SDAC aims at minimising the mean interference level between the communications of adjacent cells. The resources thus allocated to a base station can be represented as a subset of elements of a matrix with N dimensions. These resources are managed by the FDAC associated with the base station.

In addition, some resources can be freely managed at the FDAC. This is the case with the spreading codes for separating the transmission channels of the different users. The number of types of resource which the FDAC can freely manage will be denoted P. Thus all the possible values of all the resources at the base station can be described by a matrix, which will be referred to as the resources matrix, of dimension N+P, where N dimensions will already have been the subject of an allocation by the SDAC. For example, in the case of a UTRA-TDD system, if a base station has the transmission time slots and the spreading codes as resources, the matrix would be of dimension 2 and of size 15×16. Naturally, if the transmission frequency were used as an additional resource, the matrix would be of dimension 3.

Figure 3:
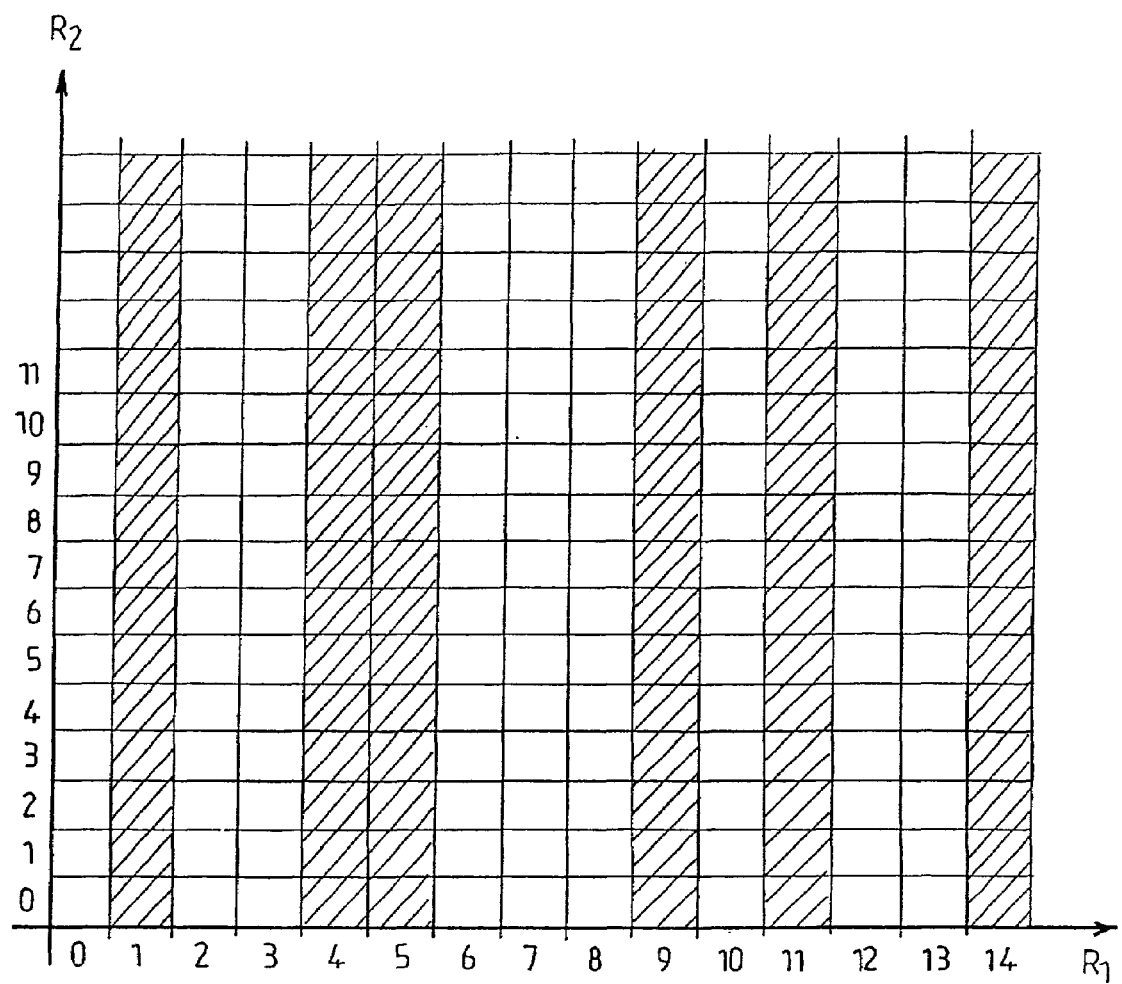
FIG. 3 depicts, in the form of a table, the possible resources and the resources available at a base station.

FIG. 3 shows such a resource matrix of dimension 2 in which the first resource $R_1$ has already been the subject of a slow allocation and the second resource $R_2$ is freely managed by the FDAC. The set of resources available at the base station, managed by the FDAC, has been represented by the non-hatched boxes. To give an idea, it will be assumed that this is a case of a UTRA-TDD system, that the resource $R_1$ is the time slot and that the resource $R_2$ is the spreading code, a single scrambling code and a single transmission frequency having been allocated by the SDAC. The FDAC can use the set of resources available for communications within the cell with which it is associated. This set is in fact divided into a first subset relating to the uplink communications and a second subset relating to the downlink communications. In a UTRA-TDD system, since the same frequencies and the same codes are used on the uplinks and the downlinks, separate dynamic allocations are carried out for the first subset and the second subset.

It is proposed according to the invention to carry out a fast allocation of the resources available at the base station according to a pseudo-random scheme whose seeds are known to the mobile terminals. In this way there is obtained a pseudo-random redistribution of the resources allocated within the set of available resources.

Figure 4:
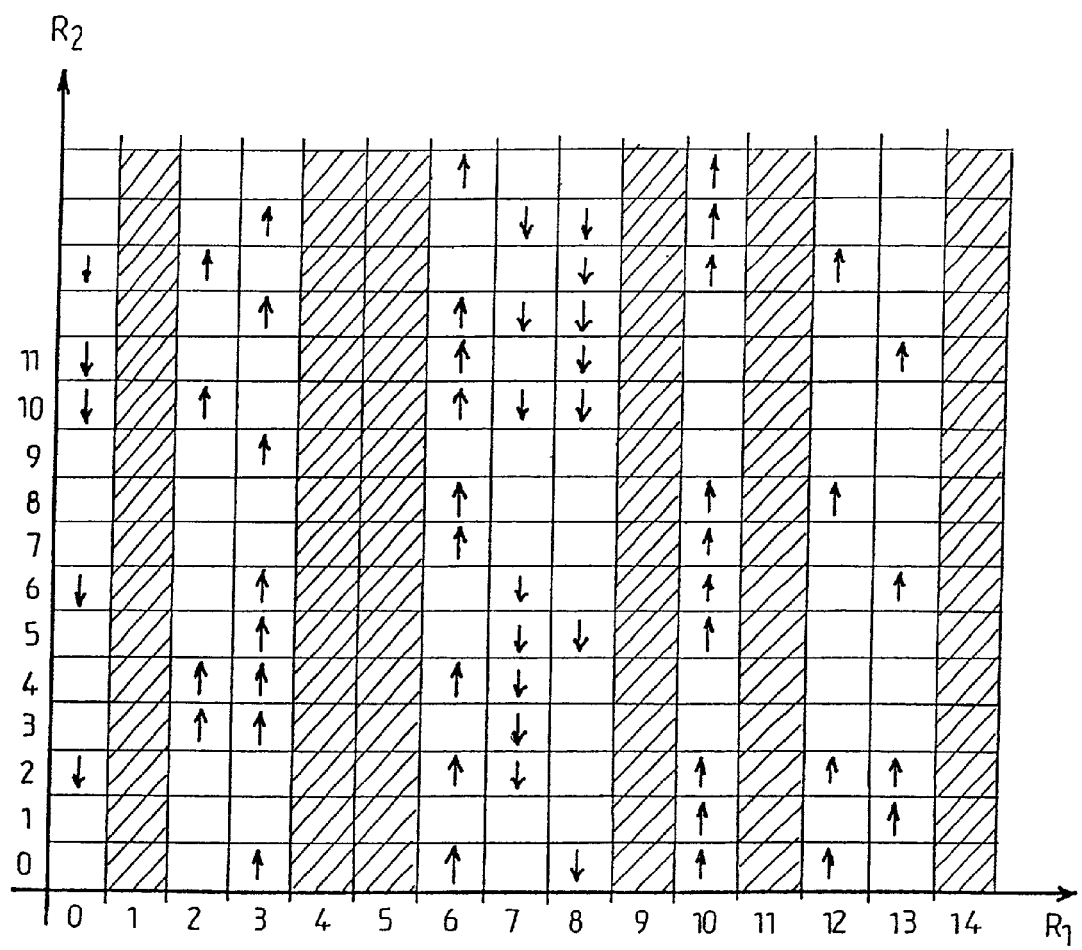
FIG. 4 depicts the available resources, after grouping together.
Figure 5:
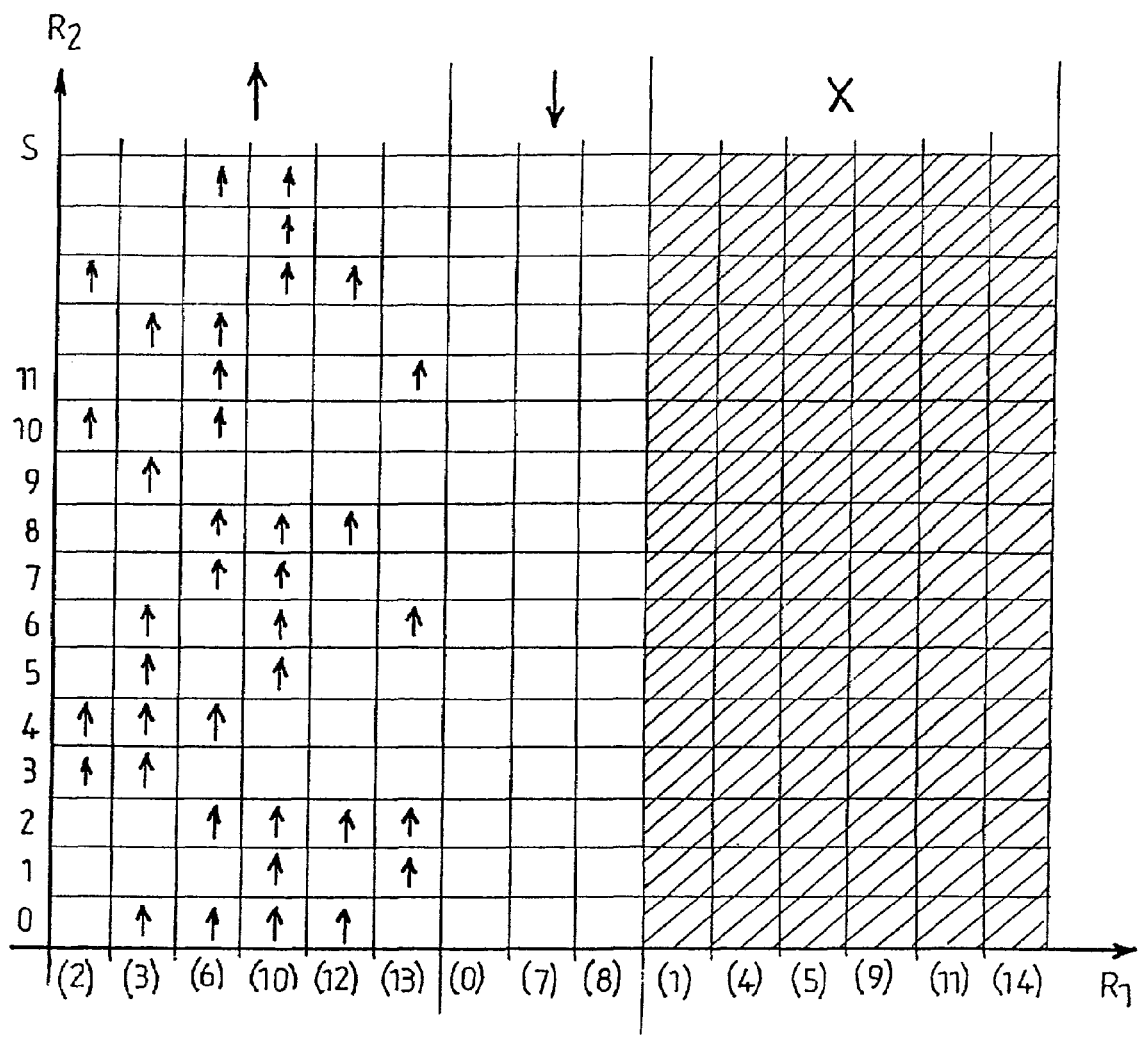
FIG. 5 depicts the resources allocated by the fast dynamic allocation amongst the available resources.

FIG. 4 depicts the fast allocation resulting from the values of a random sequence. The hatched boxes represent the unavailable values of the resources. The up and down arrows depict respectively the up and down-links. $R_2$ being a resource freely managed by the FDAC associated with the base station, it is possible to group the resources available for the uplinks on the one hand and for the downlinks on the other hand in a connected manner, as indicated in FIG. 5. The indices appearing between parentheses are the original indices of the time slots.

Only the dynamic allocation within the subset of uplinks will be considered, the allocation within the subset of downlinks being effected according to the same principle.

Assume now, after connected grouping, that the available values of $R_1$ are indexed by j=1, . . . , J and the available values of $R_2$ are indexed by s=1, ..., S. The total number of available values will be denoted T=J·S and the number of values to be allocated according to the fast dynamic allocation will be denoted A.

Putting r=(s−1)·J+j, the index r is an index of scanning of the set of available resources.

Consider a pseudo-random sequence of length $2^N-1$ greater (preferably appreciably greater) than T and consisting of words of N bits.

Such a sequence can advantageously be generated by recurrence in the following manner:

$$X(1)=x_0 \quad (1)$$

$$X(i+1)=\mod((a \cdot X(i)+b-1, 2^N)+1$$

where $x_0$ is a word of N bits, $x_0$ constituting the seed of the sequence, a−1 is a non-zero integer which is a multiple of 4, i is a sequence index, and b is an odd number.

Figure 6:
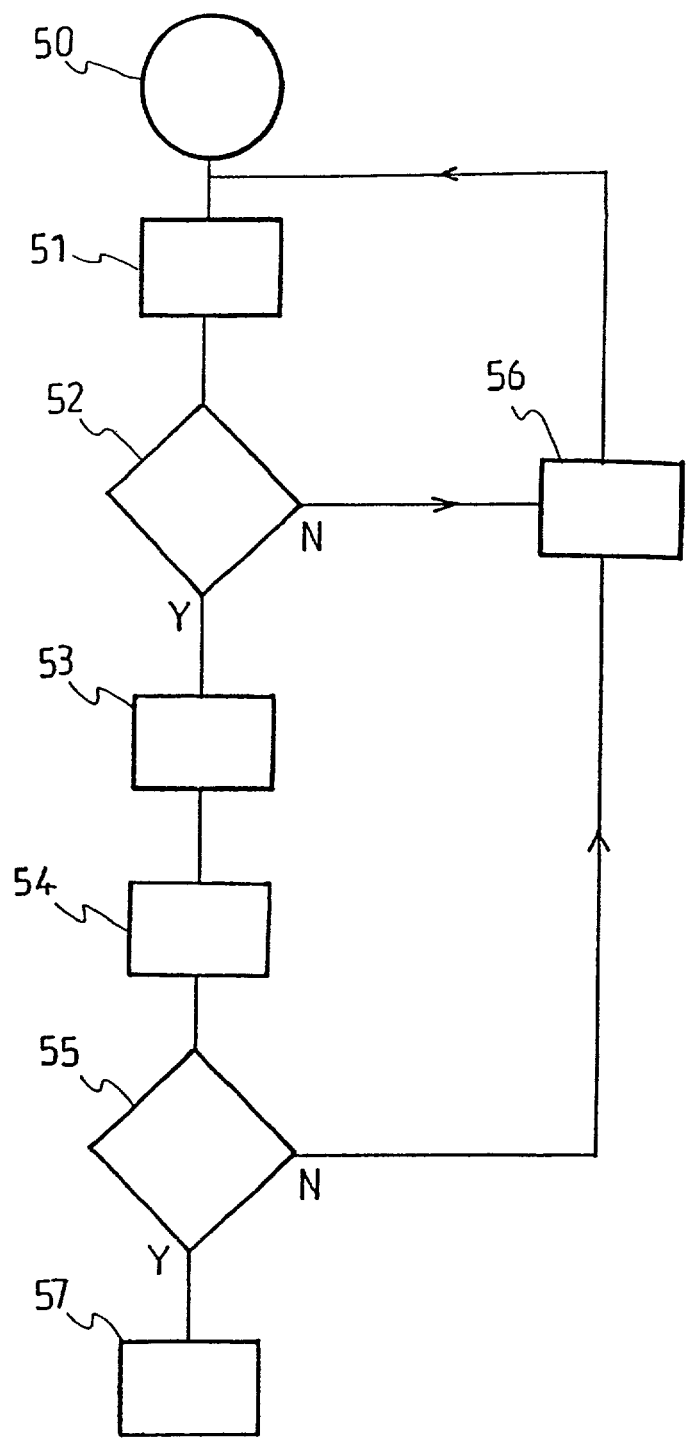
FIG. 6 depicts a flow diagram of the dynamic resource allocation method according to the invention.

The fast allocation of resources at the FDAC then takes place according to the flow diagram depicted in FIG. 6.

An index describing the current number of resources allocated will be denoted q.

At (50) the indices i and q are initialised by: i=1, q=1;
At (51) the value of X(i) is calculated.
At (52) it is tested whether X(i)≦T.

If such is the case, the value r=X(i) is allocated at (53), that is to say the pair (j,s) of values of resources $R_1$, $R_2$ indexed by the scanning index X(i) is allocated.

The allocation index is then incremented at (54): q=q+1.
At (55) it is tested whether q>A.

If this is not the case, the index i is incremented at (56): i=i+1, and the step (51) of calculating X(i) is returned to.

If the test (52) is negative, it is because the value of the pseudo-random sequence has moved outside the set of available values. The following value is then passed to by going to (56).

If the test at (55) is positive, this means that the allocation procedure is terminated (57) since all the values to be allocated have actually been allocated.

It was assumed above that $R_2$ was a resource freely managed by the FDAC. If such is not the case, for a given value of $R_1$, only certain values of $R_2$ may be available. The above algorithm must then be modified so as to include an availability test between steps (52) and (53). If the resource of index X(i) is unavailable, i is incremented at (56) without carrying out the allocation and the corresponding value of X(i) is calculated.

Sequences other than that defined at (1) can be envisaged so long as they provide an effective intermingling of the available resources. In the case of a UTRA-TDD system, for example, it is important to ensure as far as possible that, if two codes have been allocated within the same transmission time slot, they are allocated to separate time slots at the following allocation step.

The slow allocation matrix is transmitted via the base station to the mobile terminals at each allocation cycle of the SDAC. The seed ($x_0$) is also transmitted at low frequency, via the base station to the mobile terminals which it serves, for example at the slow allocation frequency. The constants a and b are predetermined values of the system known to the mobile terminals. Each terminal can therefore generate the same random sequence as the one generated at the FDAC. Consequently, if the base station reports an excessively high level of interference to the FDAC, the latter can have transmitted by the base station an instruction to change allocation on the common control channel BCH (Broadcast Channel) so that all the mobile terminals take into account the new allocation according to the new value of X given by (1). Likewise, if a mobile station detects an excessively high level of interference, it will indicate this via the base station to the FDAC, which then decides whether or not to carry out a new allocation, operating as before. In all cases, the dynamic allocation takes place without having to explicitly transmit, over the radio links, the values of the new resources allocated.

The invention claimed is:

1. A method for dynamic allocation of transmission resources to a plurality of communications between a base station and a plurality of mobile terminals, each resource including a plurality of possible configurations, a fast allocation controller associated with the base station being able to allocate to the communications only certain combinations of possible configurations, referred to as available resources, comprising:

generating a pseudo-random sequence at the fast allocation controller; and performing allocation at a regular interval at the fast allocation controller by selecting at least one available resource configuration for each of a plurality of communications between the base station and the plurality of mobile terminals at a start of each regular interval according to a value of the pseudo-random sequence; and wherein the generating generates the pseudo-random sequence by:

$$X(1)=x_0$$

$$X(i+1)=\mod(a \cdot X(i)+b-1, 2^N)+1$$

where $x_0$ is a word of N bits, $x_0$ representing a seed of the sequence, a−1 is a non-zero integer which is a multiple of 4, i is a sequence index, and b is an odd number,
and where N is an integer such that $2^N$ is greater than a maximum number of available resources.

2. The method according to claim 1, further comprising sequentially indexing each of the available resources for each regular interval, wherein a configuration of available resources is allocated if an index of the configuration is equal to a value in the pseudo-random sequence.

3. The method according to claim 1, further comprising:
transmitting parameters for generating the pseudo-random sequence from the base station to the mobile terminals and generating the pseudo-random sequence by the mobile terminals from the generation parameters.

4. The method according to claim 3, wherein the transmitting transmits the parameters for generating the pseudo-random sequence over the common control channel BCH.

5. The method according to claim 1, wherein the transmission resources of a plurality of adjacent base stations are controlled by a slow allocation controller, the resources available for each base station are determined regularly, at a first frequency, by the slow allocation controller and transmitted by the slow allocation controller to the fast allocation controllers associated with the base stations.

6. The method according to claim 5, wherein the performing the allocation allocates the resources available at the base station at a second frequency corresponding to the regular interval, the second frequency higher than the first frequency.

7. The method according to claim 1, further comprising transmitting an item of information supplying the resources available at the base station to the mobile terminals which the base station serves.

8. The method according to claim 1, wherein the resources include at least one of transmission time slots, spectral spreading codes intended to separate the different communications and transmission frequencies.

9. The method according to claim 8, wherein each base station and the mobile terminals form a portion of a UTRA-TDD mobile telecommunication system, a first subset of available resources is dedicated to uplink communications and a second subset of available resources is dedicated to downlink communications, and wherein the allocating allocates the available resources of the first subset to the uplink communications independently of allocating the available resources of the second subset to the downlink communications.

10. A communication system including:
a plurality of adjacent base stations including a base station;
a plurality of mobile terminals, each mobile terminal having a communication transmitted from the base station in the plurality of adjacent base stations;
a plurality of transmission resources, each transmission resource including a plurality of possible configurations that may be allocated to the communications of the plural mobile terminals;
a fast allocation controller associated with the base station and configured to generate a pseudo-random sequence at a first regular interval, transmit a seed for each first regular interval for generating the pseudo-random sequence to the plurality of mobile terminals, and allocate at a start of each first regular interval the available resources to each communication in the plurality of communications from the base station to the plurality of mobile terminals according to a value of the pseudo-random sequence;
a slow allocation controller configured to determine, at a second regular interval, available resources for each base station, the available resources including a subset of the possible configurations, said slow allocation controller further configured to transmit the available resources to the fast allocation controller, said second regular interval longer than said first regular interval;
said mobile terminals further configured to generate an identical pseudo-random sequence as generated at the fast allocation controller at each mobile terminal based on the seed so that each mobile terminal identifies a resource allocated thereto by the fast allocation controller;
wherein the fast allocation controller and the mobile terminals are configured to generate the pseudo-random sequence by:

$X(1)=x_0$ $X(i+1)=\mod(a \cdot X(i)+b-1, 2^N)+1$ where $x_0$ is a word of N bits, $x_0$ representing a seed of the sequence, a−1 is a non-zero integer which is a multiple of 4, i is a sequence index, and b is an odd number and where N is an integer such that $2^N$ is greater than a maximum number of available resources.

11. A method for dynamic allocation of transmission resources to a communication between a base station and a plurality of mobile terminals, each resource including a plurality of possible configurations, the method comprising:
determining available resources at first regular interval, the available resources including a subset of the possible configurations of each transmission resource to be made available to the base station;
generating a pseudo-random sequence for the base station, said pseudo-random sequence being generated from a seed;
transmitting the seed for generating the pseudo-random sequence from the base station to each mobile terminal at a predetermined frequency;
generating an identical pseudo-random sequence as generated at the fast allocation controller at each mobile terminal based on the seed so that each mobile terminal can identify a resource allocated thereto by the base station; and
allocating at the base station at a start of each first regular interval the available resources to the communication according to a value in the pseudo-random sequence,
wherein the generating a pseudo-random sequence generates the pseudo-random sequence by:

$X(1)=x_0$ $X(i+1)=\mod(a \cdot X(i)+b-1, 2^N)+1$ where $X_0$ is a word of N bits, $x_0$ representing a seed of the sequence, a−1 is a non-zero integer which is a multiple of 4, i is a sequence index, and b is an odd number, and where N is an integer such that $2^N$ is greater than a maximum number of available resources.

12. A method for dynamic allocation of resources to a communication between a base station and a mobile terminal, each resource including a plurality of possible values, the method comprising:
generating a matrix to store the plurality of possible values, each cell of the matrix being associated with a combination of possible values, and said matrix including at least two dimensions;
assigning an index to each cell in the matrix;
generating a pseudo-random sequence by a fast allocation controller associated with the base station; and
allocating a combination of possible values in the plurality of possible values to the communication based on the assigned index and a value in the pseudo-random sequence,
wherein the generating a pseudo-random sequence generates the pseudo-random sequence by:

$X(1)=x_0$ $X(i+1)=\mod(a \cdot X(i)+b-1, 2^N)+1$ where $x_0$ is a word of N bits, $x_0$ representing a seed of the sequence, a−1 is a non-zero integer which is a multiple of 4, i is a sequence index, and b is an odd number, and where N is an integer such that $2^N$ is greater than a maximum number of available resources.

13. A method of dynamic allocation of resources to a communication between a base station and a mobile terminal, each resource including a plurality of possible values, the method comprising:
determining a plurality of available combinations of values that are available for the base station from the plurality of possible values;
generating a pseudo-random sequence by a fast allocation controller associated with the base station;
selecting a subset of combinations of values from the determined plurality of available combinations based on a value of the pseudo-random sequence, a number of combinations of values in the subset of combinations of values being smaller than a number of combinations of values in the determined plurality of available combinations; and allocating at least one combination of values in the subset of combinations of values to the communication between the base station and the mobile terminal, wherein the generating generates the pseudo-random sequence by:

$X(1) = x_0$ $X(i+1) = \mod(a \cdot X(i) + b - 1, 2^N) + 1$ where $x_0$ is a word of N bits, $x_0$ representing a seed of the sequence, $a-1$ is a non-zero integer which is a multiple of 4, i is a sequence index, and b is an odd number, and where N is an integer such that $2^N$ is greater than a maximum number of available resources.

* * * * *